G. K. GILLETTE.
CHICKEN FEEDER.
APPLICATION FILED NOV. 18, 1914.
1,184,686.
Patented May 23, 1916.
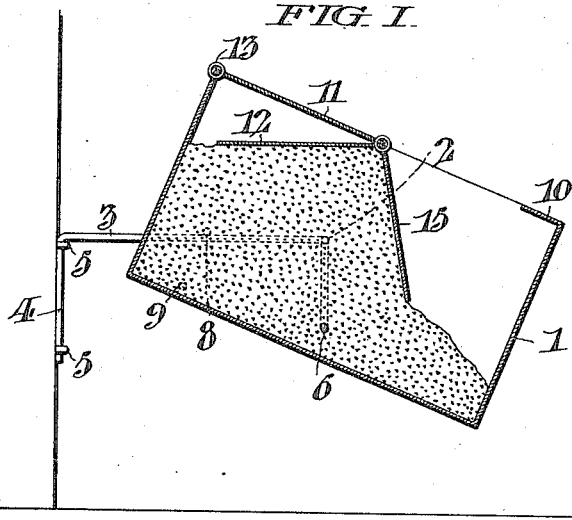
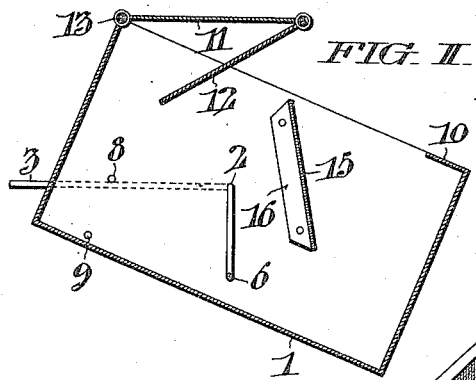
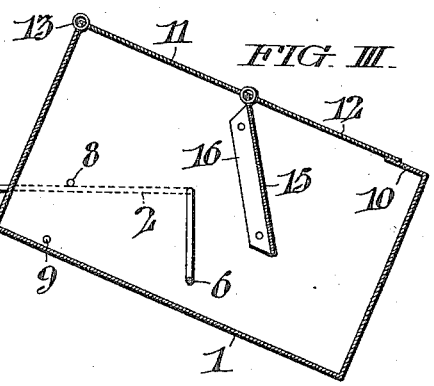
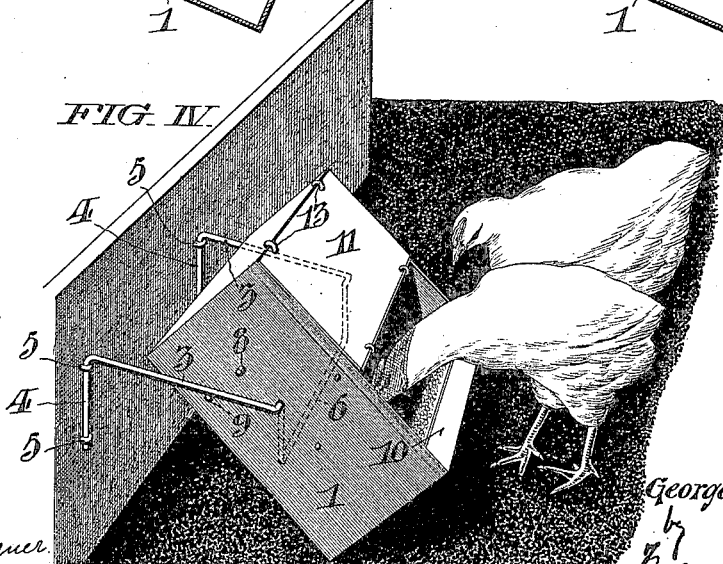

UNITED STATES PATENT OFFICE.

GEORGE K. GILLETTE, OF PEMBROKE, MASSACHUSETTS, ASSIGNOR TO WATSON MANUFACTURING COMPANY, OF LANCASTER, PENNSYLVANIA, A CORPORATION OF DELAWARE.

CHICKEN-FEEDER.

1,184,686. Specification of Letters Patent. Patented May 23, 1916.

Application filed November 18, 1914. Serial No. 872,696.

*To all whom it may concern:*

Be it known that I, GEORGE K. GILLETTE, of Pembroke, in the county of Plymouth and State of Massachusetts, have invented certain new and useful Improvements in Chicken-Feeders, whereof the following is a specification, reference being had to the accompanying drawings.

My invention relates to a swinging receptacle or box, adapted to contain chicken feed, such for example as dry mash, so swiveled as hereinafter described, as to allow a tilting motion which enables the chickens to feed from the receptacle without waste from spilling, and also to cause agitation of the contents of the box, thus preventing any clogging or caking of the same and permitting the inclination of the receptacle which is requisite to cause all of the contents to ultimately descend to the point where the chickens feed.

In the accompanying drawings, Figures I, II, and III, are sectional views of a chicken feeder embodying my invention, the lid being shown in different positions in the three views. Fig. IV, is a perspective view of the feeder.

My chicken feeder consists essentially of a box or receptacle, 1, preferably rectangular in shape, and which is swiveled on a metal supporting rod 2, passing through it in the central region so as to permit the tilting of the receptacle and its contents upon slight pressure. The rod 2, is bent to form horizontal side portions 3, and end vertical portions 4, for attachment against a wall, as for instance by means of the staples 5. The portion of the rod which passes through the receptacle is bent within the box away from the axial line as seen at 6.

On the sides of the box are placed two stops 8, and 9, at a suitable interval apart, one above and the other below the horizontal portion of the swiveling rod. These stops limit the tilting movement of the receptacle according to their position.

The box is formed with a ledge 10, protecting the lower edge of its opening. It is provided with a top or lid formed of an upper leaf 11, and a lower leaf 12. The upper leaf 11, is hinged to the upper edge of the opening of the box 1, by ordinary ring hinges 13. The lower leaf 12, is hinged to the free edge of the leaf 11. The leaf 12, is slightly less in width than the interior of the box, so as to permit it to be folded in under the leaf 11, as shown in Figs. I, and II. Its length is such that when unfolded as shown in Fig. III, it overlaps the ledge 10, and with the leaf 11, completely closes the receptacle.

The interior of the box is partially subdivided in the central region by a partition 15, attached to the sides of the box by means of bent ends 16. This partition is so placed that its upper edge lies in the region of the free end of the leaf 11. The lower edge of the partition 15, does not reach to the bottom of the box, a considerable space being left to permit the passage of chicken feed below the partition across the bottom of the box. It is preferably set angularly within the box so that when the latter is in its tilted position, the partition is more or less vertical.

When in use, all of the box is initially filled with food, except the upper part forward of the partition 15. As a protection against rain or against vermin, or to prevent the chickens from feeding, the lid may be entirely closed, as shown in Fig. III. When it is desired that chickens shall feed, the lower leaf of the lid is folded back under the upper leaf, so that its weight rests against the food occupying the rear half of the box, leaving the food in the bottom of the forward end of the box exposed in position for chickens to feed. The box ordinarily rests at the angle shown in Fig. I, so that the greater weight of the food is in the rear portion of the box, but slight picking by chickens or the pressure of the bird's neck on the edge of the box, tends to tilt it down to the position shown in Fig. IV, where the food is even more accessible to the chickens.

The ledge 10, at the foot of the hopper causes the chicken to lift the food several inches in a vertical direction before swinging its head clear of the box, so that any food or mash dropping from the bill falls back into the box. The weight of the folded leaf 12, tends to constantly push the food down to the lower front corner of the box, as the chickens feed, maintaining a sufficient supply at the point where it is accessible. At the same time, the constant tilting or swinging of the box upon its pivot, causes the bent portion of the swiveling rod within the box, to work backward and forward among the food occupying the box, thereby agitating the contents and assisting in pushing it forward. In the case of fine food, such as dry mash, this movement or agitation is important to prevent the mash from clogging. The advantage of the hopper is the steadiness of the supply of food secured and the prevention of all waste by spilling on the floor owing to the small amount exposed at any one time, the food constantly feeding down to the exposed part of the box. The tilting motion of the box tends to prevent chickens from roosting on its edge.

Having thus described my invention, I claim:

1. A chicken feeder consisting of a receptacle swiveled in the region of its center, and provided with a centrally located transverse partition extending downwardly from the top toward, but not to, the bottom.

2. A chicken feeder consisting of a receptacle swiveled in the region of its center, provided with an inclined transverse partition running downwardly from the top of the box toward, but not to, the bottom.

3. A chicken feeder consisting of a receptacle swiveled in the region of its center and capable of tilting, stops limiting the extent of the tilting movement in both directions, a transverse partition running from the top of the box toward, but not to, the bottom, so placed in relation to the tilting positions of the box that it will always occupy a substantially vertical position.

4. A chicken feeder consisting of a centrally-swiveled receptacle, provided with a transverse partition running from the top of the box toward but not to the bottom; and a lid consisting of two leaves of which the first is hinged to the upper edge of the receptacle, and the second is hinged to the first leaf, said first leaf reaching to the transverse partition and the second leaf when folded under being free to rest upon the contents of the receptacle.

5. A chicken feeder consisting of a centrally swiveled receptacle, provided with a transverse partition, running from the top of the box toward but not to the bottom; a lid hinged to the upper edge of the receptacle, reaching to the transverse partition; and a ledge extending across the lower edge of the opening, whereby the contents are kept from spilling when the receptacle is tilted.

6. A chicken feeder consisting of a receptacle swiveled in the region of its center, and a swiveling bar which runs through the receptacle and which is bent within the receptacle away from the axial line, as and for the purposes set forth.

7. A chicken feeder consisting of a receptacle swiveled in the region of its center, a swiveling bar bent to form horizontal side portions, in combination with stops set upon the side of the box to limit its tilting motion.

In testimony whereof, I have hereunto signed my name, at Pembroke, Mass., this thirteenth day of November 1914.

GEORGE K. GILLETTE.

Witnesses:
CHAUNCEY O. DAVIS,
OATHA F. KIRBY.

Copies of this patent may be obtained for five cents each, by addressing the "Commissioner of Patents, Washington, D. C."